United States Patent
Seo

(10) Patent No.: US 9,779,124 B2
(45) Date of Patent: Oct. 3, 2017

(54) MOBILE TERMINAL AND CONTROL METHOD THEREOF

(71) Applicant: LG ELECTRONICS INC., Seoul (KR)

(72) Inventor: Dongwook Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 692 days.

(21) Appl. No.: 13/954,370

(22) Filed: Jul. 30, 2013

(65) Prior Publication Data

US 2014/0058999 A1 Feb. 27, 2014

Related U.S. Application Data

(60) Provisional application No. 61/693,424, filed on Aug. 27, 2012.

(30) Foreign Application Priority Data

Oct. 11, 2012 (KR) .................... 10-2012-0113164

(51) Int. Cl.
*G06F 17/30* (2006.01)

(52) U.S. Cl.
CPC .. *G06F 17/30345* (2013.01); *G06F 17/30174* (2013.01)

(58) Field of Classification Search
CPC ......... G06F 17/30345; G06F 17/30174; G06F 17/30575; G06F 17/30867; G06F 3/04842
See application file for complete search history.

(56) References Cited

U.S. PATENT DOCUMENTS 6,763,362 B2 * 7/2004 McKeeth .......... G06F 17/30864
7,120,913 B2 * 10/2006 Kawase .................. G06F 9/542
711/173

(Continued)

FOREIGN PATENT DOCUMENTS

CN 101153803 4/2008
WO WO 02/077862 A1 10/2002

OTHER PUBLICATIONS

Sinitsyn A: "A Synchronization Framework for Personal Mobile Servers", Pervasive Communications Workshops, 2004 Proceedings of the Second IEEE Annual Conference on, Piscataway, N.J., IEEE Mar. 14, 2004, pp. 208-212, p. 1-p. 4.*

(Continued)

*Primary Examiner* — Robert Beausoliel, Jr.
*Assistant Examiner* — Susan F Rayyan
(74) *Attorney, Agent, or Firm* — KED & Associates LLP

(57) ABSTRACT

The present disclosure relates to a mobile terminal, and more particularly, to a mobile terminal for updating data files stored in a memory on a database and a control method thereof, and a mobile terminal for updating data files on a database according to the media transfer protocol (MTP) may include a memory configured to store the data files, and a controller configured to divide the data files stored in the memory into a first group composed of files to which the priority order of update is given and a second group composed of files other than those of the first group, and sequentially update the first group and the second group on the database to implement an application using data files contained in the first.

14 Claims, 9 Drawing Sheets

(56) References Cited

U.S. PATENT DOCUMENTS

| | | | | |
|---|---|---|---|---|
| 7,146,165 | B2* | 12/2006 | Manner | G06F 17/30174 455/406 |
| 7,788,267 | B2* | 8/2010 | Wolas-Shiva | G06F 17/30265 707/688 |
| 8,332,357 | B1* | 12/2012 | Chung | G06F 17/30174 707/634 |
| 8,443,007 | B1* | 5/2013 | Kindig | G06F 17/30032 707/600 |
| 9,104,686 | B2* | 8/2015 | Jogand-Coulomb | G06F 17/30147 |
| 2007/0299882 | A1* | 12/2007 | Padgett | G06F 17/30174 |
| 2008/0082255 | A1 | 4/2008 | Takahata et al. | |
| 2008/0317068 | A1* | 12/2008 | Sagar | G06F 17/30174 370/503 |
| 2009/0166110 | A1* | 7/2009 | Gregory | B66F 9/07545 180/65.31 |
| 2011/0047278 | A1* | 2/2011 | Penston | G06F 17/30176 709/227 |
| 2011/0313972 | A1* | 12/2011 | Albouze | G06F 17/30575 707/624 |
| 2012/0072401 | A1* | 3/2012 | Johri | G06F 17/30241 707/705 |
| 2012/0124570 | A1* | 5/2012 | Alberth, Jr. | G06F 8/65 717/173 |
| 2013/0218837 | A1* | 8/2013 | Bhatnagar | G06F 17/30174 707/624 |
| 2015/0199414 | A1* | 7/2015 | Braginsky | G06F 17/30132 707/613 |

OTHER PUBLICATIONS

Sinitsyn A: "A Synchronization Framework for Personal Mobile Servers"; 2004 Proceedings of the Second IEEE Annual Conference on, Piscataway, NJ, USA, IEEE; Pervasive Computing and Communications Workshops; Mar. 14, 2004, pp. 1-5 (XP010689755).

* cited by examiner

FIG. 5

| INDEX | VIDEO EXTENSION 210 | AUDIO EXTENSION 220 | IMAGE EXTENSION 230 |
|---|---|---|---|
| 1 | avi | mp3 | jpg |
| 2 | mp4 | ⋮ | jpeg |
| 3 | asf | | gif |
| 4 | wav | | png |
| 5 | mkv | | bmp |
| 6 | divx | | ⋮ |
| 7 | ogm | | |
| 8 | k3g | | |
| 9 | skm | | |
| 10 | mov | | |
| ⋮ | ⋮ | | |

(a) (b)

(c)

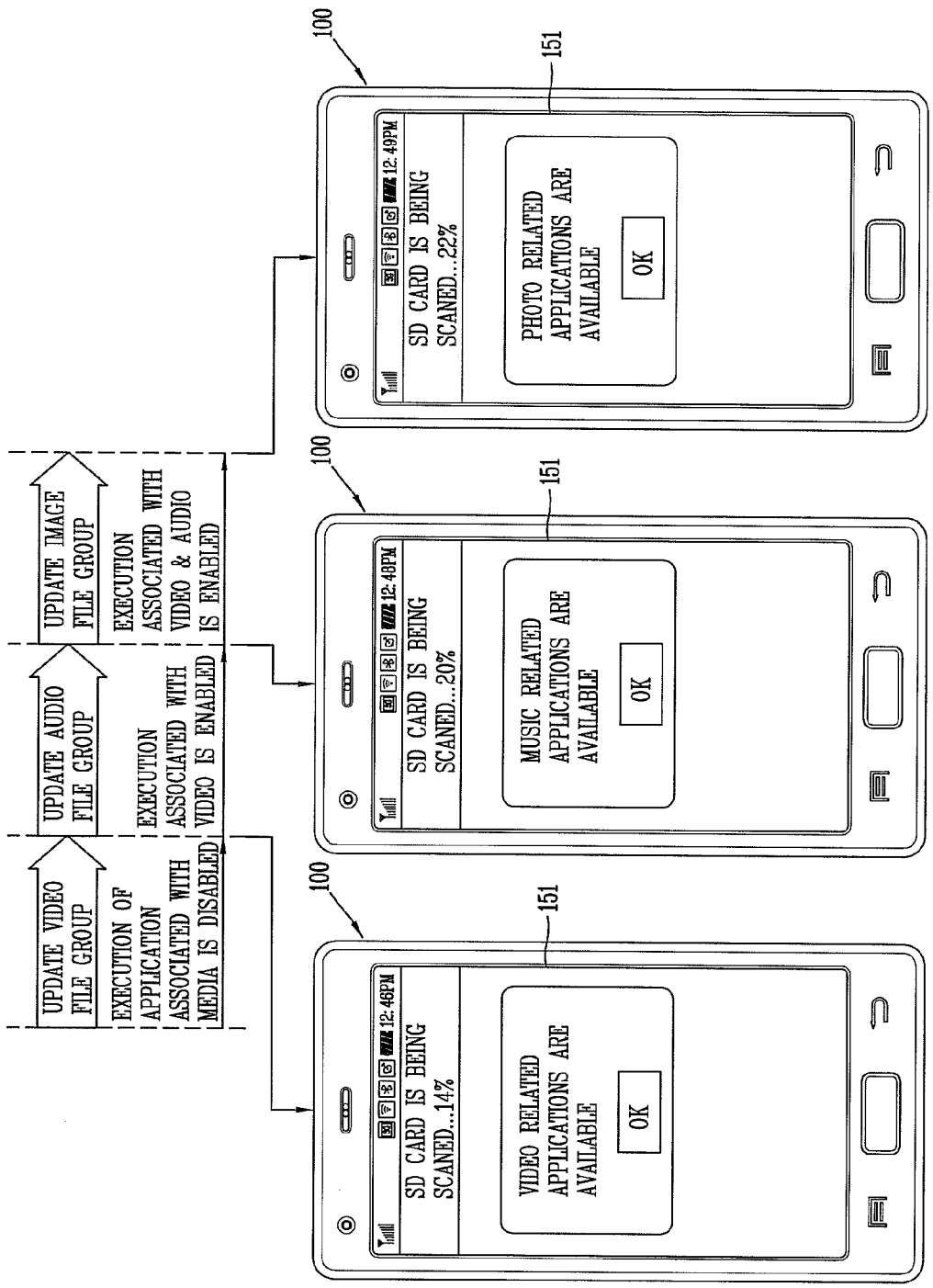

MOBILE TERMINAL AND CONTROL METHOD THEREOF

CROSS-REFERENCE TO RELATED APPLICATION(S)

Pursuant to 35 U.S.C. §119(a), this application claims the benefit of earlier filing date and right of priority to U.S. Provisional Patent Application Ser. No. 61/693,424, filed on Aug. 27, 2012 and Korean Application No. 10-2012-0113164, filed on Oct. 11, 2012, the contents of which is incorporated by reference herein in its entirety.

BACKGROUND OF THE INVENTION

1. Field of the Invention

The present disclosure relates to a mobile terminal, and more particularly, to a mobile terminal for updating data files stored in a memory on a database and a control method thereof.

2. Description of the Related Art

Terminals can be classified into mobile or portable terminals and a stationary terminals based on its mobility. Furthermore, the mobile terminals can be further classified into handheld terminals and vehicle mount terminals based on whether or not it can be directly carried by a user.

As it becomes multifunctional, for example, such a terminal is allowed to capture still images or moving images, play music or video files, play games, receive broadcast and the like, so as to be implemented as an integrated multimedia player. Moreover, the improvement of structural or software elements of the terminal may be taken into consideration to support and enhance the functions of the terminal.

Owing to the enhancement, protocols associated with the storage medium of a mobile terminal have been developed as a picture transfer protocol (PTP) and a media transfer protocol (MTP) in the USB mass-storage device class (UMS).

The media transfer protocol (MTP) has the characteristic of high stability for data stored in a storage medium and providing an encryption function for file access restriction.

However, in case of the media transfer protocol (MTP), data files stored in a storage medium should be all extracted, and the information of the extracted all data files and the directory information of the data files should be stored in a database. At this time, an application using at least one of video, audio and image files cannot be implemented until the database is generated. Accordingly, in order to implement the application, the user has no alternative but to wait during the time that the database is being generated.

SUMMARY OF THE INVENTION

An object of the present disclosure is to provide a mobile terminal and a control method thereof for updating data files according to the priority order of update when updating data files stored in a memory on the database based on the media transfer protocol (MTP).

Furthermore, another object of the present disclosure is to provide a mobile terminal and a control method thereof for changing the priority order of update for data files based on the user's input.

An embodiment of the present disclosure relates to a mobile terminal. There is provided a mobile terminal for updating data files on a database according to the media transfer protocol (MTP), and the mobile terminal may include a memory configured to store the data files, and a controller configured to divide the data files stored in the memory into a first group composed of files to which the priority order of update is given and a second group composed of files other than those of the first group, and sequentially update the first group and the second group on the database to implement an application using data files contained in the first group prior to completing the update of the second group.

As an example associated with the present invention, the controller may divide the data files into the first and the second group using the extension of data files, respectively. Files to which the priority order of update is given may correspond to at least one of video, audio, and image files. Furthermore, the controller may divide files contained in the first group into video, audio, and image file groups using each extension, and update the video, audio, and image file groups on the database based on a preset order.

As another example associated with the present disclosure, the mobile terminal may further include a user input unit configured to sense the user's input for changing the preset order, wherein the controller changes the preset order based on the user's input sensed by the user input unit.

As still another example associated with the present disclosure, the controller may store an execution history in which applications have been executed in the memory, and change the preset order based on the execution history stored in the memory.

As yet still another example associated with the present disclosure, the controller may calculate a number of files contained in the video, audio, and image file groups, respectively, and changes the preset order based on the number of files.

As still yet another example associated with the present disclosure, the memory may store an extension list containing the extension of files to which the priority order is given, and the controller may compare the extension of the data files, respectively, with extensions contained in the extension list, and divide the data files into the first and the second group based on the comparison result.

As yet still another example associated with the present disclosure, the controller may store the link information of files contained in the first and the second group in a cache memory as a first and a second link list, respectively. The controller may further store the directory information of the data files in the cache memory as a third link list. Furthermore, the controller may update the database using at least one of the first, the second and the third link list.

As still yet another example associated with the present disclosure, the mobile terminal may further include a display unit configured to display the update progress status of the database, wherein the controller checks the update progress status using at least one of the first, the second and the third link list stored in the cache memory, and controls the display unit to show the checked update progress status to the user. Furthermore, when the update of the first group is completed, the controller may control the display unit to show the fact of completion to the user.

Furthermore, an embodiment of the present disclosure relates to a control method of a mobile terminal. There is provided a control method of a mobile terminal for updating data files on a database according to the media transfer protocol (MTP), and the method may include dividing the data files into a first group composed of files to which the priority order of update is given and a second group composed of files other than those of the first group, updating the first group on the database, and completing the update of the first group, and then updating the second group on the database to implement an application using data files contained in the first group prior to completing the update of the second group.

As an embodiment associated with the present disclosure, said dividing the data files into the first and the second group may include extracting the data files from the memory, comparing the extension of the data files, respectively, with an extension list stored in the memory, and dividing the data files into the first and the second group according to a result of comparing with the extension list.

As another embodiment associated with the present disclosure, the first group may be further divided into video, audio, and image file groups according to the result of comparing with the extension list, and said updating the first group on the database may update the video, audio, and image file groups on the database based on a preset order.

As still another embodiment associated with the present disclosure, the method may further include sensing the user's input for changing the preset order, and changing the preset order based on the user's input.

As yet still another embodiment associated with the present disclosure, the method may further include storing the link information of files contained in the first and the second group as a first and a second link list, respectively, and the directory information of the memory as a third link list, wherein the first and the second group are updated on the database using at least one of the first, the second and the third link list.

As still yet another embodiment associated with the present disclosure, the method may further include checking the update progress status of the database using at least one of the first, the second and the third link list stored in the cache memory, and controlling the display unit to show the update progress status to the user. Furthermore, the method may further include controlling the display unit to show the fact of completion to the user when the update of the first group is completed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 5 is a view for explaining an extension list according to an embodiment of the present disclosure;

FIGS. 7 through 10 are exemplary views illustrating a mobile terminal according to an embodiment of the present disclosure.

DETAILED DESCRIPTION OF THE INVENTION

Figure 1:
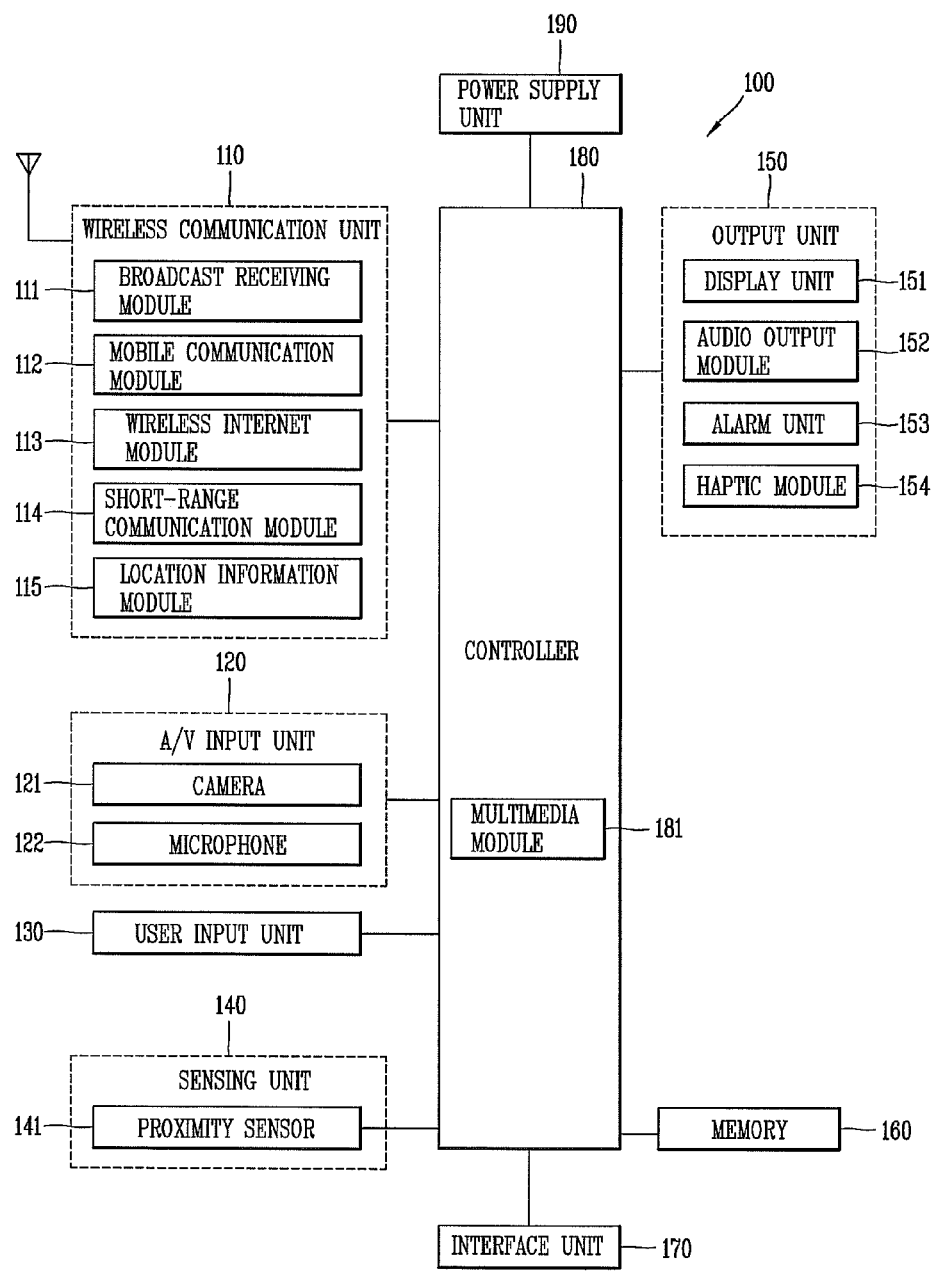
FIG. 1 is a block diagram illustrating a mobile terminal according to an embodiment of the present disclosure.

Hereinafter, preferred embodiments of the present invention will be described in detail with reference to the accompanying drawings to such an extent that the present invention can be easily embodied by a person having ordinary skill in the art to which the present invention pertains. However, the present invention may be implemented in various different forms, and therefore, the present invention is not limited to the illustrated embodiments. In order to clearly describe the present invention, parts not related to the description are omitted, and like reference numerals designate like constituent elements throughout the specification.

A mobile terminal disclosed herein may include a portable phone, a smart phone, a laptop computer, a digital broadcast mobile device, a personal digital assistant (PDA), a portable multimedia player (PMP), a navigator, and the like. However, it would be easily understood by those skilled in the art that a configuration according to the following description may be applicable to a stationary terminal such as a digital TV, a desktop computer, and the like, excluding constituent elements particularly configured for mobile purposes.

FIG. 1 is a block diagram illustrating a mobile terminal 100 associated with the present invention. Referring to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, a power supply unit 190, and the like. However, the constituent elements as illustrated in FIG. 1 are not necessarily required, and the mobile communication terminal may be implemented with greater or less number of elements than those illustrated elements.

Hereinafter, the constituent elements 110-190 of the mobile terminal 100 will be described in sequence.

The wireless communication unit 110 may include one or more elements allowing radio communication between the mobile terminal 100 and a wireless communication system, or allowing radio communication between the mobile terminal 100 and a network in which the mobile terminal 100 is located. For example, the wireless communication unit 110 may include a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel. The broadcast associated information may mean information regarding a broadcast channel, a broadcast program, a broadcast service provider, and the like. The broadcast associated information may also be provided through a mobile communication network. In this case, the broadcast associated information may be received by the mobile communication module 112. The broadcast signal and broadcast-associated information received through the broadcast receiving module 111 may be stored in the memory 160.

The mobile communication module 112 transmits and/or receives a radio signal to and/or from at least one of a base station, an external terminal and a server over a mobile communication network. The radio signal may include a voice call signal, a video call signal or various types of data according to text and/or multimedia message transmission and reception.

The wireless Internet module 113 as a module for supporting wireless Internet access may be built-in or externally installed to the mobile terminal 100. A variety of wireless Internet access techniques may be used, such as WLAN (Wireless LAN), Wi-Fi, Wibro (Wireless Broadband), Wimax (World Interoperability for Microwave Access), HSDPA (High Speed Downlink Packet Access), and the like.

The short-range communication module 114 refers to a module for supporting a short-range communication. A variety of short-range communication technologies may be used, such as Bluetooth, Radio Frequency IDentification (RFID), Infrared Data Association (IrDA), Ultra WideBand (UWB), ZigBee, and the like.

The location information module 115 is a module for acquiring a location of the mobile terminal 100, and there is a GPS module as a representative example.

Subsequently, referring to FIG. 1, the A/V (audio/video) input unit 120 receives an audio or video signal, and the A/V (audio/video) input unit 120 may include a camera 121, a microphone 122, and the like. The camera 121 processes an image frame, such as still or moving images, obtained by an image sensor in a video phone call or image capturing mode. The processed image frame may be displayed on a display unit 151. The image frames processed by the camera 121 may be stored in the memory 160 or transmitted to an external device through the wireless communication unit 110. Two or more cameras 121 may be provided according to the use environment of the mobile terminal.

The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated during the process of receiving the external audio signal.

The user input unit 130 may generate input data to control an operation of the mobile terminal 100. The user input unit 130 may be configured with a keypad, a dome switch, a touch pad (pressure/capacitance), a jog wheel, a jog switch, and the like.

The sensing unit 140 detects presence or absence of the user's contact, and a current status of the mobile terminal 100 such as an opened or closed configuration, a location of the mobile terminal 100, an orientation of the mobile terminal 100, an acceleration or deceleration of the mobile terminal 100, and the like, and generates a sensing signal for controlling the operation of the mobile terminal 100. For example, when the mobile terminal 100 is a slide phone type, the sensing unit 140 may sense an opened or closed configuration of the slide phone. Furthermore, the sensing unit 140 may sense whether or not power is supplied from the power supply unit 190, or whether or not an external device is coupled to the interface unit 170.

The sensing unit 140 may include a proximity sensor 141. Furthermore, the sensing unit 140 may include a touch sensor (not shown) for sensing a touch operation with respect to the display unit 151.

The touch sensor may be implemented as a touch film, a touch sheet, a touch pad, and the like. The touch sensor may be configured to convert changes of a pressure applied to a specific part of the display unit 151, or a capacitance generated from a specific part of the display unit 151, into electric input signals. The touch sensor may be configured to sense not only a touched position and a touched area, but also a touch pressure.

When the touch sensor and display unit 151 forms an interlayer structure, the display unit 151 may be used as an input device rather than an output device. The display unit 151 may be referred to as a "touch screen".

When there is a touch input through the touch screen, the corresponding signals may be transmitted to a touch controller (not shown). The touch controller processes signals transferred from the touch sensor, and then transmits data corresponding to the processed signals to the controller 180. Accordingly, the controller 180 may sense which region of the display unit 151 has been touched.

When the touch screen is a capacitance type, the proximity of a sensing object may be detected by changes of an electromagnetic field according to the proximity of a sensing object. The touch screen may be categorized into a proximity sensor 141.

The proximity sensor 141 refers to a sensor for detecting the presence or absence of a sensing object using an electromagnetic field or infrared rays without a mechanical contact. The proximity sensor 141 has a longer lifespan and more enhanced utility than a contact sensor. The proximity sensor 141 may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like.

Hereinafter, for the sake of convenience of brief explanation, a behavior of closely approaching the touch screen without contact will be referred to as "proximity touch", whereas a behavior that the pointer substantially comes in contact with the touch screen will be referred to as "contact touch".

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The output unit 150 may generate an output related to visual, auditory, tactile senses. The output unit 150 may include a display unit 151, an audio output module 152, an alarm unit 153, a haptic module 154, and the like.

The display unit 151 may display (output) information processed in the mobile terminal 100. For example, when the mobile terminal 100 is operated in a phone call mode, the display unit 151 may display a user interface (UI) or graphic user interface (GUI) related to a phone call. When the mobile terminal 100 is operated in a video call mode or image capturing mode, the display unit 151 may display a captured image, a received image, UI, GUI, or the like.

The display unit 151 may include at least one of a liquid crystal display (LCD), a thin film transistor-liquid crystal display (TFT-LCD), an organic light emitting diode (OLED) display, a flexible display, a 3-dimensional (3D) display, and an e-ink display.

At least one of those displays (or display devices) included in the display unit 151 may be configured with a transparent or optical transparent type to allow the user to view the outside therethrough. It may be referred to as a transparent display. A representative example of the transparent display may be a transparent OLED (TOLED), and the like. The rear structure of the display unit 151 may also be configured with an optical transparent structure. In other words, the display unit 151 may include a first surface and a second surface overlapped with each other, and the first and the second surface may be configured with a transparent or optical transparent structure. Under this configuration, the user can view an object positioned at a rear side of the mobile device body through a region occupied by the display unit 151 of the mobile device body. The display unit 151 may be referred to as a transparent display unit 155.

There may exist two or more display units 151 according to the implementation of the mobile terminal 100. For example, a plurality of the display units 151 may be placed on one surface in a separate or integrated manner, or may be place on different surfaces, respectively.

The audio output module 152 may output audio data received from the wireless communication unit 110 or stored in the memory 160, in a call-receiving mode, a call-placing mode, a recording mode, a voice selection mode, a broadcast reception mode, and the like. The audio output module 152 may output an audio signal related to a function carried out in the mobile terminal 100 (for example, sound alarming a call received or a message received, and the like). The audio output module 152 may include a receiver, a speaker, a buzzer, and the like.

The alarm unit 153 outputs signals notifying the occurrence of an event from the mobile terminal 100. The examples of an event occurring from the mobile terminal 100 may include a call received, a message received, a key signal input, a touch input, and the like. The alarm unit 153 may output not only video or audio signals, but also other types of signals such as signals for notifying the occurrence of an event in a vibration manner. Since the video or audio signals may be also output through the display unit 151 or the audio output unit 152, the display unit 151 and the audio output module 152 may be categorized into part of the alarm unit 153.

The haptic module 154 generates various tactile effects that can be felt by the user. A representative example of the tactile effects generated by the haptic module 154 may include vibration. Vibration generated by the haptic module 154 may have a controllable intensity, a controllable pattern, and the like. For example, different vibrations may be output in a synthesized manner or in a sequential manner.

The haptic module 154 may generate various tactile effects, including not only vibration, but also arrangement of pins vertically moved with respect to a skin surface being touched, air injection force or air suction force through an injection port or suction port, touch by a skin surface, contact with an electrode, effects by stimulus such as an electrostatic force, reproduction of cold or hot feeling using a heat absorbing device or heat emitting device, and the like.

The haptic module 154 may be configured to transmit tactile effects through the user's direct contact, or the user's muscular sense using a finger or a hand. Two or more haptic modules 154 may be provided according to the configuration of the mobile terminal 100.

The memory 160 may store a program for operating the controller 180, or temporarily store input/output data (for example, phonebooks, messages, still images, moving images, and the like). The memory 160 may store data related to various patterns of vibrations and sounds outputted when performing a touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the portable terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as "identification device") may be implemented in a type of smart card. Hence, the identification device can be coupled to the mobile terminal 100 via a port.

The interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing related to telephony calls, data communications, video calls, and the like. The controller 180 may include a multimedia module 181 which provides multimedia playback. The multimedia module 181 may be configured as part of the controller 180 or as a separate component. The controller 180 can perform a pattern recognition processing so as to recognize a handwriting or drawing input on the touch screen as text or image.

The power supply unit 190 may receive external or internal power to provide power required by various components under the control of the controller 180.

Various embodiments described herein may be implemented in a computer or similar device readable medium using software, hardware, or any combination thereof.

For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform the functions described herein. In some cases, such embodiments may be implemented in the controller 180 itself.

For software implementation, the embodiments such as procedures or functions may be implemented together with separate software modules that allow performing of at least one function or operation. Software codes can be implemented by a software application written in any suitable programming language. The software codes may be stored in the memory 160 and executed by the controller 180.

Hereinafter, the method of processing a user input to the mobile terminal 100 will be described.

The user input unit 130 is manipulated to receive a command for controlling the operation of the mobile terminal 100, and may include a plurality of manipulation units.

The manipulation units may be commonly designated as a manipulating portion, and any method may be employed if it is a tactile manner allowing the user to perform manipulation with a tactile feeling.

Various kinds of visual information may be displayed on the display unit 151. The visual information may be displayed in the form of a character, a numeral, a symbol, a graphic, an icon, and the like. For an input of the visual information, at least one of a character, a numeral, a symbol, a graphic, and an icon may be displayed with a predetermined arrangement so as to be implemented in the form of a keypad. Such a keypad may be referred to as a so-called "soft key."

The display unit 151 may operate on an entire region or operate by dividing into a plurality of regions. In case of the latter, the plurality of regions may be configured to operate in an associative way. For example, an output window and an input window may be displayed on the upper and lower portions of the display unit 151, respectively. The output window and the input window may be regions allocated to output or input information, respectively. A soft key on which numerals for inputting a phone number or the like are displayed is outputted on the input window. When the soft key is touched, a numeral corresponding to the touched soft key is displayed on the output window. When the first manipulating unit is manipulated, a phone call connection for the phone number displayed on the output window will be attempted or a text displayed on the output window will be entered to the application.

The display unit 151 or touch pad may be configured to sense a touch scroll. The user may move an object displayed on the display unit 151, for example, a cursor or pointer placed on an icon or the like, by scrolling the display unit 151 or touch pad. Moreover, when a finger is moved on the display unit 151 or touch pad, a path being moved by the finger may be visually displayed on the display unit 151. It may be useful to edit an image displayed on the display unit 151.

In order to cope with a case where the display unit 151 and touch pad are touched together within a predetermined period of time, one function of the terminal 100 may be implemented. For the case of being touched together, there is a case when the user clamps a body of the mobile terminal 100 using his or her thumb and forefinger. For one of the above functions implemented in the mobile terminal 100, for example, there may be an activation or de-activation for the display unit 151 or touch pad.

Describing the controller 180 according to the present disclosure again, the controller 180 may be operated by the media transfer protocol (MTP). According to the media transfer protocol (MTP), the mobile terminal 100 should generate a database for data files stored in the memory 160. For example, if it corresponds to at least one of a case that the power of the mobile terminal 100 is turned off and then on again, a case that a storage medium such as the memory 160 is separated and then connected again, and a case that the operating system is restarted by booting, then the controller 180 should generate a database for data files stored in the memory 160.

The controller 180 cannot implement an application using a data file stored in the memory 160 prior to generating such a database. In particular, an application using a media file containing at least one of video, audio and image files can be implemented only after completing the generation of a database. The application (or app) refers to a set of computer programs designed to implement a specific task since the controller 180 implements and controls the application using a database.

According to the media transfer protocol (MTP), the controller 180 should generate a database for data files and directories stored in the memory 160. For example, the memory may be a flash memory such as a SD card or the like. The database may be formed with a file such as "external.db". The database file may be deleted and then newly generated or otherwise updated using the existing database file.

The controller 180 may update data files and directories stored in the memory 160. Updating data files on a database may refer to inserting the link information of data files to the database. For another example, it may refer to updating the link information of data files on the database.

The method of generating a database file may be implemented in various ways. For example, a database file may be generated subsequent to completing the update of all data files stored in the memory 160, or otherwise the update of data files may be carried out subsequent to generating a database file. Hereinafter, a method of allowing the controller 180 to generate and update a database will be described in detail with reference to FIGS. 3 and 4.

Figure 2A:
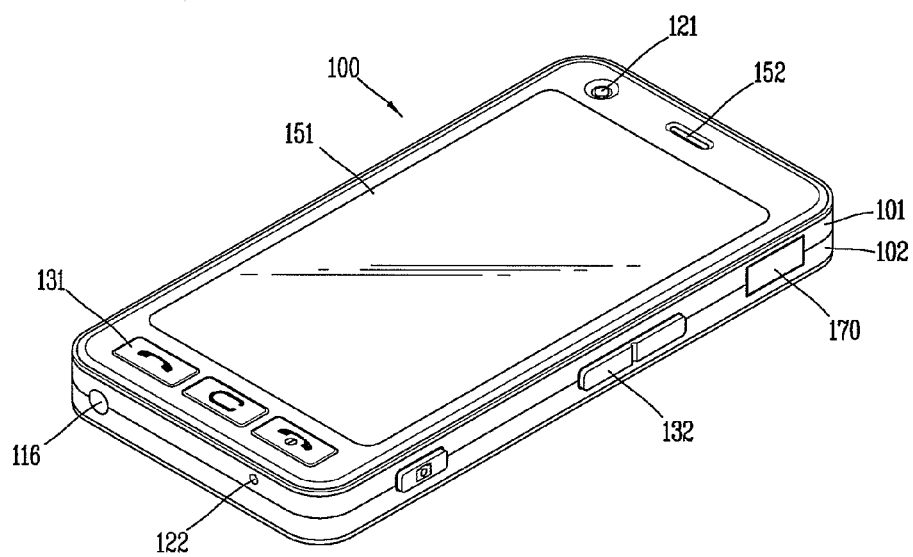
FIGS. 2A and 2B are perspective views illustrating an external appearance of the mobile terminal associated with the present disclosure.
Figure 2B:
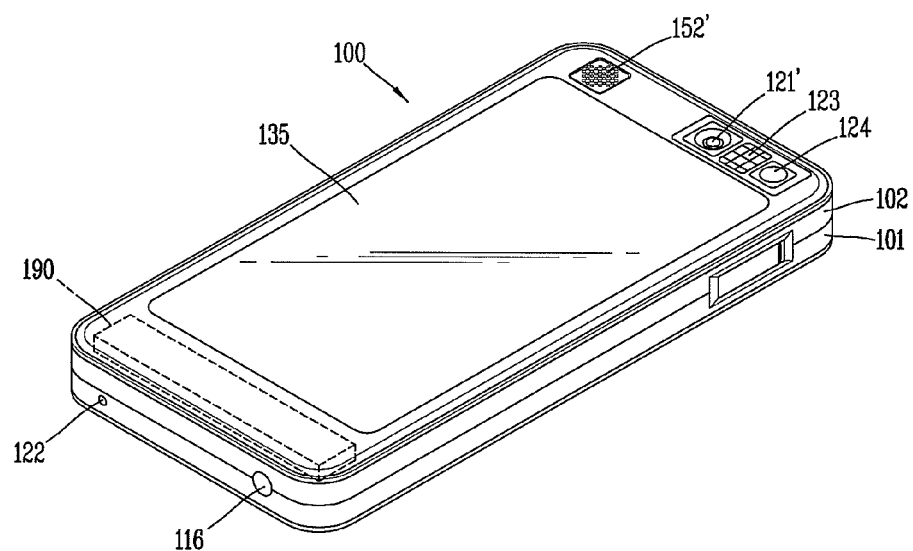

FIGS. 2A and 2B are perspective views illustrating the external appearance of a mobile terminal 100 related to the present disclosure. FIG. 2A is a front and a side view illustrating the mobile terminal 100, and FIG. 2B is a rear and the other side view illustrating the mobile terminal 100.

Referring to FIG. 2A, the mobile terminal 100 disclosed herein is provided with a bar-type terminal body. However, the present invention is not only limited to this type of terminal, but also applicable to various structures of terminals such as slide type, folder type, swivel type, swing type, and the like, in which two and more bodies are combined with each other in a relatively movable manner.

The terminal body includes a case (casing, housing, cover, etc.) forming an appearance of the terminal. In this embodiment, the case may be divided into a front case 101 and a rear case 102. Various electronic components may be integrated in a space formed between the front case 101 and the rear case 102. At least one middle case may be additionally disposed between the front case 101 and the rear case 102.

The cases may be formed by injection-molding a synthetic resin or may be also formed of a metal material such as stainless steel (STS), titanium (Ti), or the like.

A display unit 151, an audio output module 152, a camera 121, a user input unit 130 (refer to FIG. 1), a microphone 122, an interface 170, and the like may be arranged on the terminal body, mainly on the front case 101.

The display unit 151 occupies a most portion of the front case 101. The audio output unit 152 and the camera 121 are disposed on a region adjacent to one of both ends of the display unit 151, and the user input unit 131 and the microphone 122 are disposed on a region adjacent to the other end thereof. The user interface 132 and the interface 170, and the like, may be disposed on a lateral surface of the front case 101 and the rear case 102.

The user input unit 130 is manipulated to receive a command for controlling the operation of the portable terminal 100. The user input unit 130 may include a plurality of manipulation units 131, 132.

The first and the second manipulation unit 131, 132 may receive various commands. For example, the first manipulation unit 131 may be used to receive a command, such as start, end, scroll, or the like. The second manipulation unit 132 may be used to receive a command, such as controlling a volume level being outputted from the audio output unit 152, or switching it into a touch recognition mode of the display unit 151.

Referring to FIG. 2B, a camera 121' may be additionally mounted on a rear surface of the terminal body, namely, the rear case 102. The rear camera 121' has an image capturing direction, which is substantially opposite to the direction of the front camera 121 (refer to FIG. 2A), and may have different number of pixels from those of the front camera 121.

For example, the front camera 121 may be configured to have a relatively small number of pixels, and the rear camera 121' may be configured to have a relatively large number of pixels. Accordingly, in case where the front camera 121 is used for video communication, it may be possible to reduce the size of transmission data when the user captures his or her own face and sends it to the other party in real time. On the other hand, the rear camera 121' may be used for the purpose of storing high quality images.

On the other hand, the cameras 121, 121' may be provided in the terminal body in a rotatable and popupable manner.

A flash 123 and a mirror 124 may be additionally disposed adjacent to the rear camera 121'. The flash 123 illuminates light toward an object when capturing the object with the camera 121'. The mirror 124 allows the user to look at his or her own face, or the like, in a reflected way when capturing himself or herself (in a self-portrait mode) by using the rear camera 121'.

A rear audio output unit 152' may be additionally disposed on a rear surface of the terminal body. The rear audio output unit 152' together with the front audio output unit 152 (refer to FIG. 2A) can implement a stereo function, and it may be also used to implement a speaker phone mode during a phone call.

An antenna 116 for receiving broadcast signals may be additionally disposed on a lateral surface of the terminal body. The antenna 116 constituting part of a broadcast receiving module 111 (refer to FIG. 1) may be provided so as to be pulled out from the terminal body.

A power supply unit 190 for supplying power to the portable terminal 100 may be mounted on the terminal body. The power supply unit 190 may be configured so as to be incorporated in the terminal body, or directly detachable from the outside of the terminal body.

A touch pad 135 for detecting a touch may be additionally mounted on the rear case 102. The touch pad 135 may be also configured with an optical transmission type, similarly to the display unit 151 (refer to FIG. 2A). Alternatively, a rear display unit for displaying visual information may be additionally mounted on the touch pad 135. At this time, information displayed on the both surfaces of the front display unit 151 and rear display unit may be controlled by the touch pad 135.

The touch pad 135 may be operated in conjunction with the display unit 151 of the front case 101. The touch pad 135 may be disposed in parallel at a rear side of the display unit 151. The touch pad 135 may have the same size as or a smaller size than the display unit 151.

Figure 3:
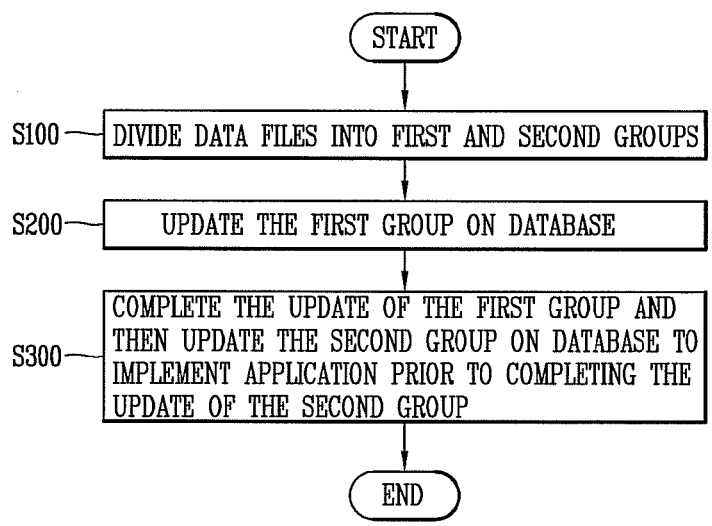
FIGS. 3 and 4 are flow charts illustrating a control method of a mobile terminal according to an embodiment of the present disclosure.
Figure 4:
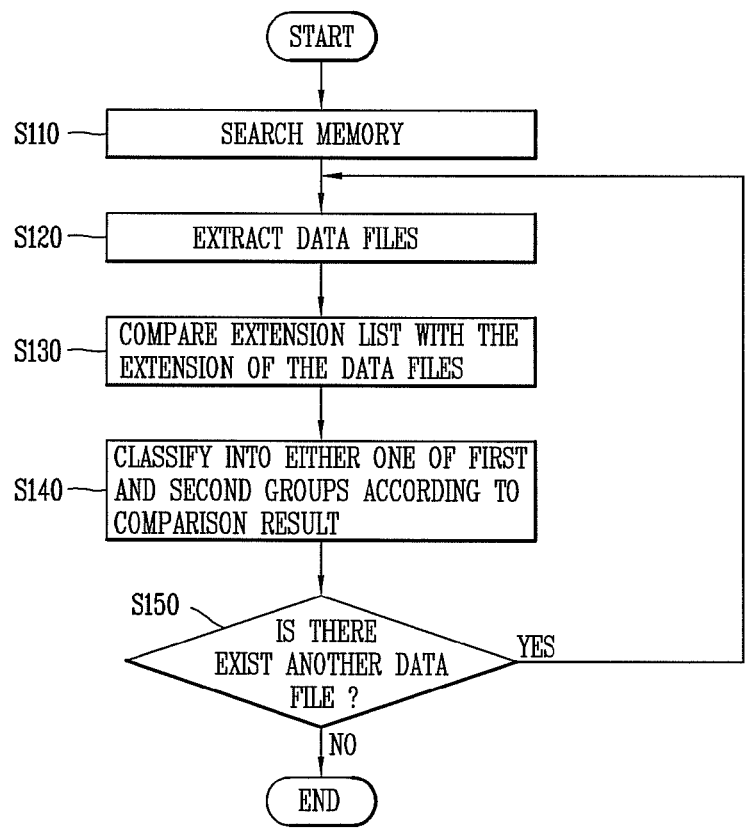

FIGS. 3 and 4 are flow charts illustrating a control method of a mobile terminal according to an embodiment of the present disclosure.

Referring to FIG. 3, a control method of the mobile terminal 100 according to the present disclosure may include the process (S100) of dividing data files into a first and a second group. The controller 180 may divide all data files stored in the memory 160 into a first and a second group.

The data files may be a collection of data stored in the memory 160. At this time, the memory 160 may be a flash memory as an auxiliary storage device in which the stored information is not erased even when power is off.

The first group may be composed of files to which the priority order of update is given in data files updated on a database according to the media transfer protocol (MTP). Furthermore, the second group may be composed of files other than those of the first group.

The priority order of update may vary according to whether or not it is a data file required to implement an application. For example, the controller 180 may divide data files into a first group when it corresponds to at least one of video, audio and image files, or otherwise divide them into a second group.

Next, the process of updating the first group on a database may be carried out. The controller 180 may preferentially update files contained in the first group on a database among data files stored in the memory 160.

When the first group composed of files to which the priority order of update is given is all updated on a database, the controller 180 may implement an application using at least one data file contained in the first group.

Next, the process of updating the second group on a database may be carried out subsequent to completing the update of the first group to implement an application prior to completing the update of the second group. The controller 180 may enable multitasking for performing several operations at the same time. Accordingly, the controller 180 may implement an application using at least data file contained in the first group while performing the update of the second group. As a result, the controller 180 can sequentially update the first and the second group on a database.

Consequently, according to the present disclosure, the mobile terminal 100 may sequentially update the first and the second group on a database to divide data files stored in the memory 160 into the first and the second group and implement an application prior to completing the update of the second group, thereby implementing the application using the data files while at the same time updating the database. Accordingly, it may be possible to reduce a time required for implementing an application.

FIG. 4 is a flow chart for explaining the process (S100) of dividing data files into a first and a second group.

Referring to FIG. 4, the process (S100) of dividing data files into a first and a second group may include the process (S100) of searching a memory. Unless a database is generated according to the media transfer protocol (MTP), the controller 180 can search the memory 160.

Next, the process (s120) of extracting data files may be carried out. For example, the controller 180 may sequentially extract data files stored in the memory 160 using the hierarchical structure of a directory. The order of extracting data files may be configured in various ways.

Next, the process (S130) of extracting a data file may be carried out. The data file extracted by the controller 180 may include an extension. The extension may refer to a text string directly attached to a file name to indicate a kind of file. The extension may indicate an attribute of the data file or a program written for the file.

The controller 180 may compare an extension of the extracted data file with an extension list. At this time, the extension list may include at least one of basic extensions. The basic extensions may be a criterion for specifying files to which the priority order of update is given among data files stored in the memory 160. For example, the controller

180 may compare and determine whether or not the extension of the extracted data file is contained in the extension list.

Furthermore, the extension list may be further divided into at least one of video, audio and image extension lists. Accordingly, the controller 180 may compare whether or not the data file corresponds to at least one of video, audio and image extension lists using at least one of the video, audio and image extension lists.

At this time, when comparing the extension of the data file with the extension list, they may be compared according to the comparison order of basic extensions contained in the extension list. The comparison order can be changed using the update of the operating system or the like or changed by the user's input. The comparison order of basic extensions will be described later using FIG. 5.

Next, the process (S140) of classifying a data file into either one of the first and the second group according to the comparison result may be carried out. The controller 180 may compare an extension list with an extension of the data file, and classify the data file into either one of the first and the second group according to the comparison result.

For example, when the extension list contains one basic extension ("avi"), files with the extension "avi" among the data files stored in the memory 160 may be contained in the first group, and files with the remaining extensions may be contained in the second group.

Furthermore, the extension list may be further divided into at least one of video, audio and image extension lists, and thus the controller 180 may further classify a data file corresponding to the first group into at least one of video, audio and image groups using at least one of video, audio and image extension lists.

Next, when there exists other data files, it may return to the process (S120) of extracting data files, and otherwise, the process (S100) of dividing data files into a first and a second group may be terminated. In other words, the foregoing processes (S120 to S150) can be repeated until all data files stored in the memory 160 are divided into a first and a second group.

Though not shown in the drawing, when the process (S100) of dividing data files into a first and a second group is terminated, the process of storing the link information of files contained in the first and the second group in a cache memory as a first and a second link list, respectively, may be subsequently carried out. At this time, the controller 180 may store directory information constituting the memory 160 in a cache memory as a third link list.

The mobile terminal 100 may display the update progress status on the display unit 151 when updating data files stored in the memory 160 on a database. For example, the update progress status may be displayed on the display unit 151 as a message such as "Progress ratio is 49%".

According to the related art for displaying the update progress status, the mobile terminal 100 has no alternative but to search the memory 160 several times to know the whole number of files stored in the memory 160. For example, the controller 180 iteratively implements a function such as "native_getNumFiles( )" to search the memory 160 several times. Since the memory 160 is iteratively searched, the update of the database has to be slowed down.

According to the present disclosure, the controller 180 can update a database using at least one of the first, the second and the third link list stored in the cache memory. Here, the cache memory may refer to a high-speed buffer memory used to reduce the access speed difference between the central processing unit and the main storage device.

Furthermore, the controller 180 may check the update progress status of the database using at least one of the first, the second and the third link list (hereinafter, referred to as "link lists") stored in the cache memory, and control the display unit 151 to show the checked update progress status to the user.

Since the link lists contains all necessary information associated with data files stored in the memory 160, the controller 180 may update a database using link lists stored in the cache memory. As a result, according to the present disclosure, the mobile terminal 100 may update the database to display the update progress status on the display unit 151 by searching the memory 160 only once. Accordingly, it may be possible to increase the update processing speed compared to the related art for searching the memory 160 several times.

FIG. 5 is a view for explaining an extension list according to an embodiment of the present disclosure.

Referring to FIG. 5, an extension list may include at least one of a video extension list 210, an audio extension list 220 and an image extension list 230. It is illustrated that the extension list is divided into the video, audio and image extension lists 210-230, but also the extension list may be configured with one extension list with no such demarcation.

The basic extensions of the extension lists may be set with the comparison order. Then, the controller 180 may compare the extension of data file with the extension list according to the comparison order. For example, the controller 180 may compare them in the order of the video, audio and image extension lists, and furthermore, compare them in the order of index when compared with the video extension list. For example, referring to FIG. 5, they can be compared in the order of "avi", "mp4", "asf", . . . , "mov".

At this time, a time for dividing data files into a first and a second group may be reduced by changing the comparison order. For example, when the update of the database is completed, the controller 180 may store the update history in the memory 160. At this time, if the number of data files corresponding to "mp4" is greater than that of "avi", then the comparison order of extension lists may be changed from the order of "avi"→"mp4" to the order of "mp4"→"avi". For another example, the manufacturer of terminals may investigate extensions used for the data files of the mobile terminal 100, and change the comparison order of basic extensions in the order of frequently used extensions.

Figure 6:
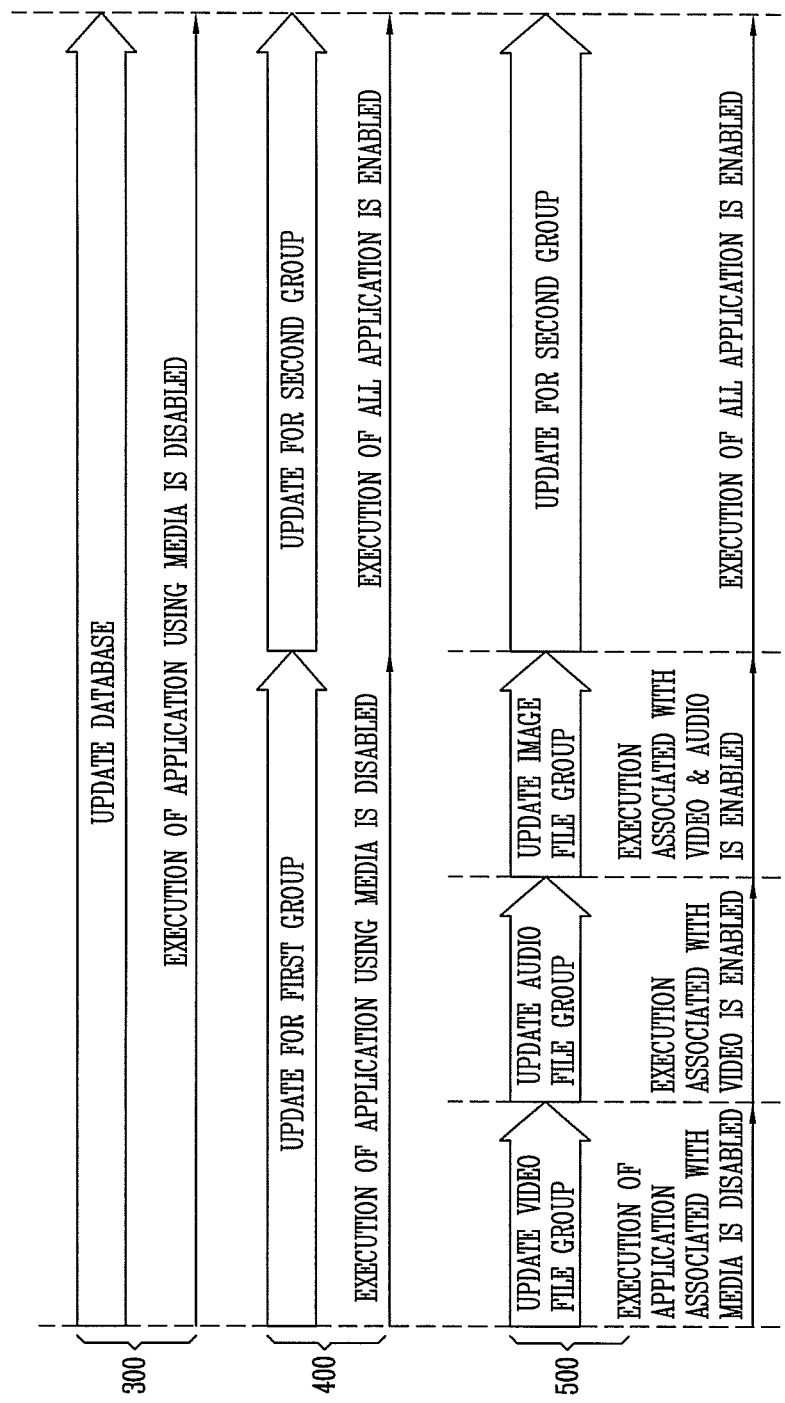
FIG. 6 is a block diagram for explaining a mobile terminal for updating a database according to an embodiment of the present disclosure.

FIG. 6 is a block diagram for explaining a mobile terminal for updating a database according to an embodiment of the present disclosure.

Referring to FIG. 6, there are illustrated block diagrams illustrating an embodiment 300 according to the media transfer protocol (MTP) and embodiments 400, 500 according to the present disclosure. According to an embodiment 300 according to the media transfer protocol (MTP), an application using a media file cannot be implemented until the update of the database is completed.

According to an embodiment 400 of the present disclosure, when the update of the first group is completed, all applications can be implemented. According to another embodiment 500 of the present disclosure, for example, at least one of video, audio and image file groups may be sequentially updated on a database. In this case, when the update of each file group is completed, applications using the completed file group can be implemented. Furthermore, when the update of each file group is completed, the controller 180 can control the display unit 151 to show the completed file group to the user.

As described above, the first group may be divided into at least one of video, audio and image file groups. At this time, the controller 180 may update video, audio and image file groups on the database based on a preset order. The preset order may be changed by the user's input. The description associated with a preset order will be described later with reference to FIGS. 7 and 8.

FIGS. 7 through 10 are exemplary views illustrating a mobile terminal according to an embodiment of the present disclosure.

Figure 7:
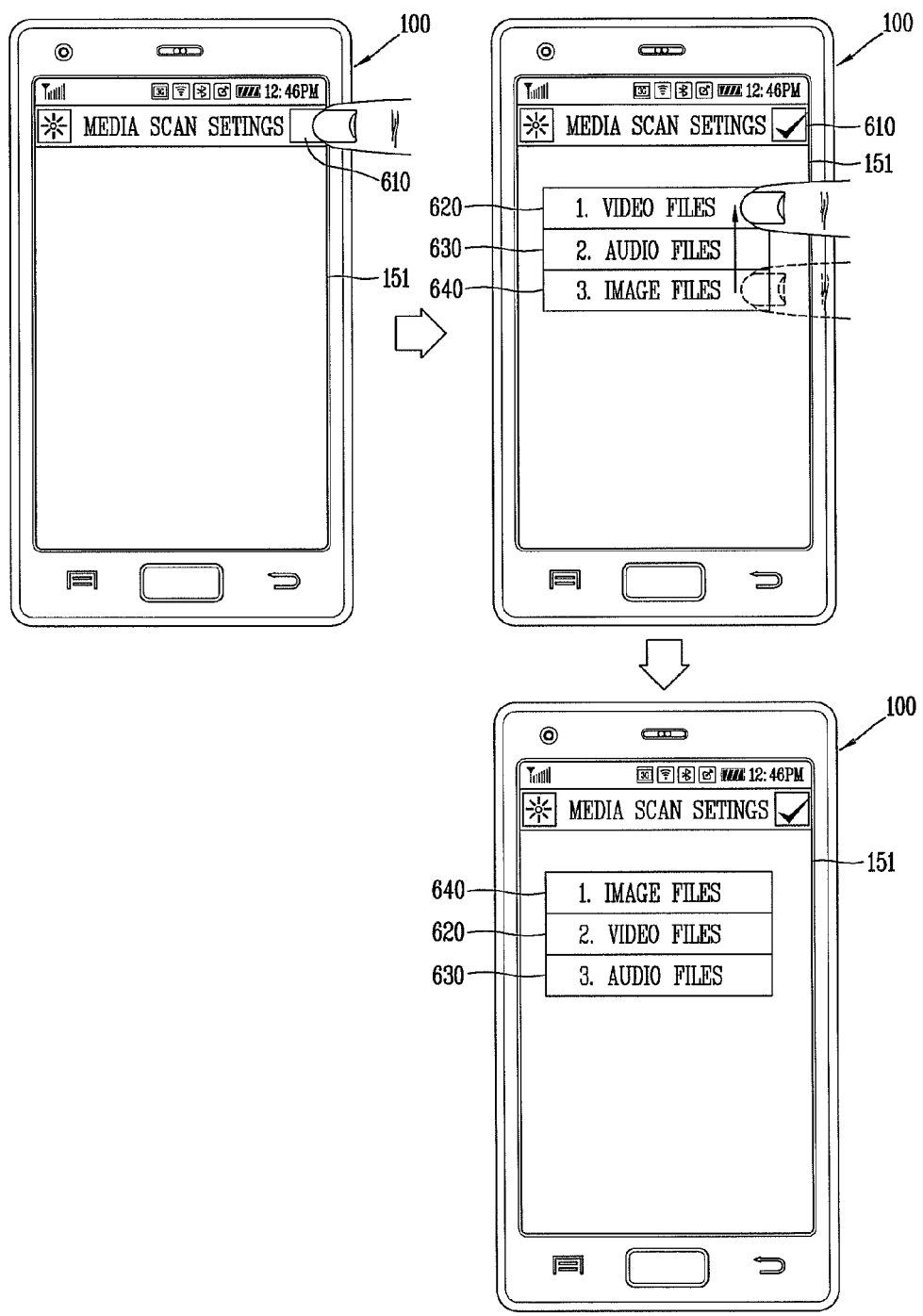

Referring to FIG. 7, the mobile terminal 100 for scanning a memory is illustrated. The mobile terminal 100 may scan a memory mounted on the body subsequent to the completion of booting. Scan may refer to a function of updating the link information of data files stored in the memory on a database. Here, for example, the memory may be a flash memory such as a SD card or the like.

When scanning data files stored in the memory, the controller 180 according to the present disclosure may scan them by distinguishing a media scan from a non-media scan. For example, the media scan may refer to a database update for data files corresponding to at least one of video, audio and image formats, and the non-media scan may refer to a database update for the other remaining data files.

In other words, the controller 180 may divide data files stored in the memory 160 into a first and a second group, and sequentially update the first and the second group on a database. Moreover, the controller 180 may further divide the first group into at least one of video, audio and image groups, and update the video, audio and image groups on a database according to a preset order.

At this time, the user may change the preset order using media scan settings 610. When the user's input to the media scan settings 610 is sensed, the controller 180 may display the preset order on the display unit 151. For example, referring to FIG. 7, the preset order may be in the order of video, audio and image groups 620, 630, 640.

When the user input for placing the image group to the highest priority is sensed, the controller 180 may change the preset order from the order of video, audio and image groups 620, 630, 640 to that of image, video and audio groups 640, 620, 630. When the change is completed, the controller 180 may update the first group on a database using the changed order. The method of changing a preset order may be implemented in various ways.

Figure 8:
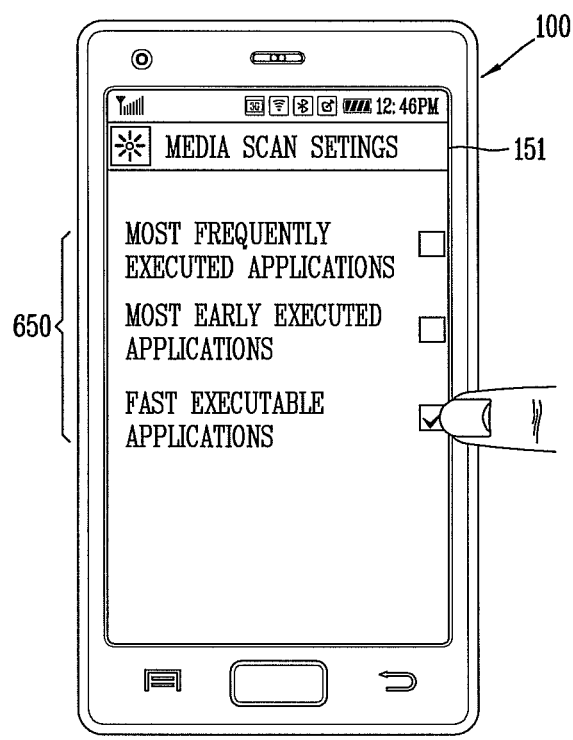

Referring to FIG. 8, there is illustrate a mobile terminal 100 for configuring a media scan. Options capable of changing the preset order may be displayed on the display unit 151.

The controller 180 may store an execution history in which applications have been executed in the memory 160. The execution history may be at least one of a number of implementations of each application, a number of initial implementations subsequent to updating the database, and a number of initial implementations subsequent to releasing the lock of the mobile terminal 100. The controller 180 may change the preset order based on the execution history of applications stored in the memory 160.

Furthermore, the controller 180 may calculate a number of files contained in the video, audio, and image file groups, respectively, and change the preset order based on the number of files. When the database is updated in the order of file groups with the least number of files, the update of file groups with the least number of files may be quickly completed. For example, when they are updated from the video file group in case where the number of video files is 1, and the number of audio files is 100000, an application using video files can be quickly implemented. The controller 180 may also update the database in the order of file groups with the highest number of files.

At this time, for example, upon receiving the user's input to any one of "most frequently executed applications", "most early executed applications" and "fast executable applications", the controller 180 may change the preset order based on the user's input.

Figure 9:
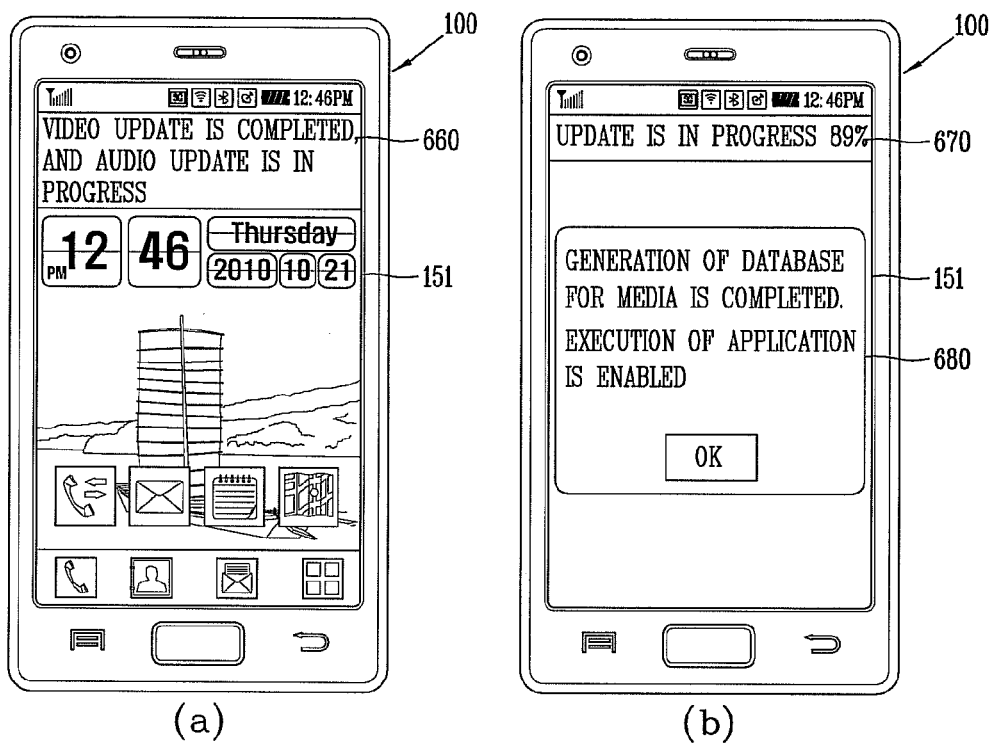
Figure 9:
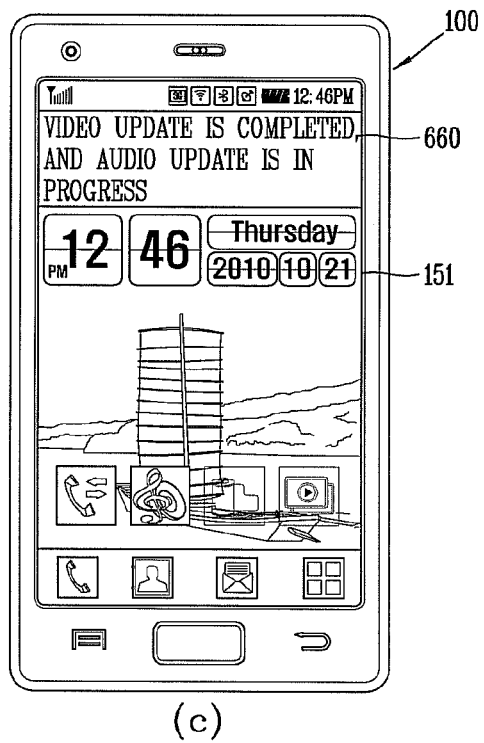

FIG. 9 is a view illustrating the mobile terminal 100 for guiding the update progress status to the user using the display unit 151.

Referring to FIG. 9A, the home screen may be displayed on the display unit 151. At this time, the controller 180 may check the update progress status using at least one of the first, the second and the third link list stored in the cache memory, and display the update progress status on the display unit 151. The update progress status may be a database update progress ratio, an update progress ratio for the first group, whether or not the update of at least one of video, audio and image groups has been completed, or the like.

For example, the controller 180 may display an update progress status in an indicator region 660 at an upper end of the home screen. For another example, referring to FIG. 9B, the controller 180 may display an update progress status using a popup window.

Furthermore, referring to FIG. 9C, the controller 180 may display available applications to be differentiated from unavailable applications on the display unit 151 based on the update of the database. For example, if the update of the video group is completed, and the update of the image group is being progressed, and the update of the audio group is not started yet, then an application using at least one of the image and audio files cannot be implemented. At this time, the controller 180 may adjust the icon transparency of non-executable applications. For another example, an image indicating the fact that it is non-executable may be displayed on the icon of a non-executable application.

Referring to FIG. 10, there is illustrated a mobile terminal according to an embodiment of the present disclosure. The display unit 151 may display the progress status of a database update. For example, the controller 180 may calculate an update progress ratio using the whole number of data files stored in the memory and the whole number of data files updated on the database, and display the calculated update progress ratio on the display unit 151.

Furthermore, when the update of at least one of the video, audio and image file groups to which the priority order is given is completed, the fact of completion may be displayed on the display unit 151. For example, referring to FIG. 10, the mobile terminal 100 may display a message capable of implementing an application associated with videos (or moving pictures) when the update of the video group is completed. In this manner, whenever the update process is completed, the controller 180 may display a message for the group for which the update has been completed on the display unit 151.

Referring to FIG. 10, it is illustrated that they are updated in the order of video, audio and image file groups, but the update progress order may be changed as described with reference to FIG. 7.

Though not shown in the drawing, according to the present disclosure, the controller 180 may sequentially update the first and the second group to implement an application using data files contained in the first group prior to completing the update of the second group. Accordingly, the data size of the database may be continuously increased while implementing an application using at least one of video, audio and image files. Moreover, an insert log for inserting data into the database may be generated while implementing an application using at least one of video, audio and image files.

Furthermore, as a flash memory, the memory 160 may be configured in a detachable manner. When the memory 160 is detached therefrom by the user or due to other reasons, the controller 180 may restore the database to an original state (rollback). According to the database rollback function, when the memory 160 is attached thereto again, an error may not occur.

According to the present disclosure, data files may be updated according to the priority order of update, thereby implementing an application using the data files while at the same time updating the database.

Furthermore, according to the present disclosure, the priority order of update may be changed based on the user's input, thereby reducing a time consumed for configuring an application desired to be implemented as the highest priority and implementing the application. As a result, it may be possible to enhance the user's convenience.

Furthermore, according to the present disclosure, link lists may be stored in a cache memory to update a database using the link lists, thereby increasing the update speed of the database.

Furthermore, according to the present disclosure, link lists stored in a cache memory may be used, and thus searching the memory several times may not be required. In other words, the database may be updated to display the update progress status by searching the memory once.

While the invention has been shown and described with respect to various embodiments of the present invention, it will be of course understood by those skilled in the art that various modifications may be made without departing from the gist of the invention as defined in the following claims, and it is to be noted that those modifications should not be understood individually from the technical concept and prospect of the present invention.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal to update data files on a database according to a media transfer protocol (MTP), comprising:
a display;
a memory configured to store the data files; and
a controller configured to:
separate the data files stored in the memory into a first group and a second group, the first group being composed of files to which a priority order of update is provided, the second group composed of files other than files of the first group;
update the first group on the database; and
implement an application using data files contained in the first group while the second group is updated on the database when updating of the first group is completed,
wherein the memory stores an extension list including the extension of data files to which the priority order is provided, and
the controller compares the extension of the data files, respectively, with extensions provided in the extension list, and the controller separates the data files into the first group and the second group based on a result of the comparing,
wherein the controller separates files contained in the first group into video, audio, and image file groups using each extension, and the controller updates the video, audio, and image file groups on the database based on a comparison order of frequently used extensions.

2. The mobile terminal of claim 1, wherein the controller stores, in memory, link information of files contained in the first group and the second group as a first link list and a second link list, respectively.

3. The mobile terminal of claim 2, wherein the controller further stores, in memory, directory information of the memory as a third link list.

4. The mobile terminal of claim 3, wherein the controller updates the database using at least one of the first link list, the second link list and the third link list.

5. The mobile terminal of claim 4, further comprising:
the display configured to display an update status of the database,
wherein the controller determines the update status using at least one of the first link list, the second link list and the third link list, and the controller controls the display to display the update status.

6. A method of a mobile terminal to update data files on a database according to a media transfer protocol (MTP), the method comprising:
separating the data files into a first group and a second group, the first group being composed of files to which a priority order of update is provided, and the second group composed of files other than files of the first group;
updating the first group on the database;
completing the updating of the first group;
separating a plurality of applications installed in the mobile terminal into an executable application and an non-executable application according to an update progress status of the data files;
limiting an implementation of the non-executable application;
implementing an application using data files contained in the first group prior to updating the second group on the database; and displaying, via a display of the mobile terminal, information for informing at least one executable application according to the update progress status, wherein separating the data files into the first group and the second group comprises:
extracting the data files from a memory;
comparing an extension of the data files, respectively, with an extension list stored in the memory; and
separating the data files into the first group and the second group according to a result of the comparing of the extension of data files and the extension list, wherein the first group is further separated into video, audio, and image file groups according to the result of the comparing, and the updating of the first group on the database includes updating the video, audio, and image file groups on the database based on a comparison order of frequently used extensions.

7. The method of claim 6, further comprising:
storing link information of files contained in the first group and the second group as a first link list and a second link list, respectively, and storing directory information as a third link list,
wherein the first group and the second group are updated on the database using at least one of the first link list, the second link list and the third link list.

8. The method of claim 7, further comprising:
determining an update status of the database using at least one of the first link list, the second link list and the third link list stored in a memory; and
controlling the display to display the update status.

9. A mobile terminal to update data files, comprising:
a display;
a memory configured to store data files; and
a controller configured to separate the data files stored in the memory into a first group on a database and a second group on the database, the first group including files having a priority update order, the second group including files other than files of the first group, and the controller to update the first group on the database according to media transfer protocol, to subsequently update the second group on the database according to the media transfer protocol, and to execute an application using data files contained in the first group prior to completing the update of the second group on the database,
wherein the memory stores an extension list including the extension of data files to which the priority update order is provided, and
the controller compares the extension of the data files, respectively, with extensions provided in the extension list, and the controller separates the data files into the first group and the second group based on a result of the comparing,
wherein the controller separates files contained in the first group into video, audio, and image file groups using each extension, and the controller updates the video, audio, and image file groups on the database based on a comparison order of frequently used extensions.

10. The mobile terminal of claim 9, wherein the controller stores link information of files contained in the first group and the second group as a first link list and a second link list, respectively, and wherein the controller further stores directory information as a third link list, and the controller updates the database using at least one of the first link list, the second link list and the third link list.

11. The mobile terminal of claim 10, further comprising:
the display configured to display an update status of the database,
wherein the controller determines the update status using at least one of the first link list, the second link list and the third link list, and the controller controls the display to display the update status.

12. A method of a mobile terminal to update data files, the method comprising:
separating data files into a first group on a database and a second group on the database, the first group including files to which a priority update order is provided, and the second group composed of files other than files of the first group;
updating the first group on the database according to media transfer protocol;
separating a plurality of applications installed in the mobile terminal into an executable application and an non-executable application according to an update progress status of the data files stored in memory;
limiting an implementation of the non-executable application;
completing the update of the first group, and then updating the second group on the database according to media transfer protocol, and to implement an application using data files contained in the first group prior to completing the updating of the second group on the database; and
displaying, via a display of the mobile terminal, information for informing at least one executable application according to the update progress status, wherein separating the data files into the first group and the second group comprises:
extracting the data files from a memory;
comparing an extension of the data files, respectively, with an extension list stored in the memory; and
separating the data files into the first group and the second group according to a result of the comparing of the extension of data files and the extension list, wherein the first group is further separated into video, audio, and image file groups according to the result of the comparing, and the updating of the first group on the database includes updating the video, audio, and image file groups on the database based on a comparison order of frequently used extensions.

13. The method of claim 12, further comprising:
storing link information of files contained in the first group and the second group as a first link list and a second link list, respectively, and directory information as a third link list,
wherein the first group and the second group are updated on the database using at least one of the first link list, the second link list and the third link list.

14. The method of claim 13, further comprising:
determining a status update of the database using at least one of the first link list, the second link list and the third link list stored in a memory; and
controlling the display to display the update status.

* * * * *